Figure 1:
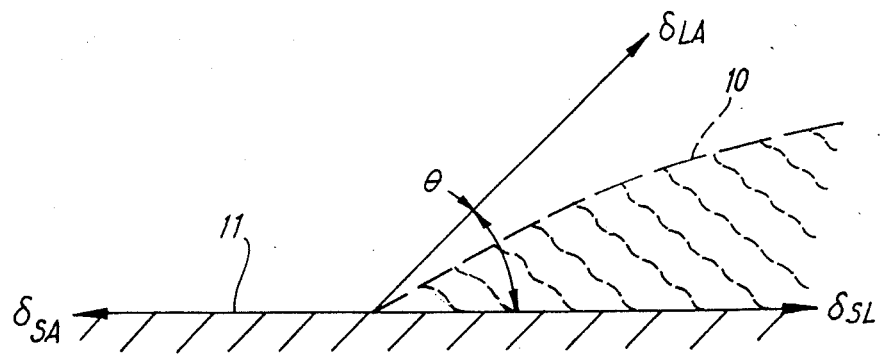

United States Patent [19]

Geddes

[11] Patent Number: 4,957,982

[45] Date of Patent: Sep. 18, 1990

[54] PROCESS FOR REDUCING REACTOR FOULING DURING POLYMERIZATION IN AN AQUEOUS MEDIUM

[75] Inventor: Kenneth R. Geddes, Clitheroe, England

[73] Assignee: Crown Decorative Products Limited, Derby, England

[21] Appl. No.: 215,765

[22] Filed: Jul. 6, 1988

[30] Foreign Application Priority Data

Jul. 10, 1987 [GB] United Kingdom ............... 8716377

[51] Int. Cl.$^5$ ........................... C08F 2/16; C08F 2/22
[52] U.S. Cl. ........................................ 526/62; 526/74; 427/230
[58] Field of Search .................... 526/62, 74; 427/230

[56] References Cited

U.S. PATENT DOCUMENTS

| | | | |
|---|---|---|---|
| 4,344,993 | 8/1982 | Schmidt et al. | 526/62 X |
| 4,604,411 | 8/1986 | Yada et al. | 526/62 X |
| 4,696,983 | 9/1987 | Cohen | 526/344.2 X |

OTHER PUBLICATIONS

Polymer Handbook (2nd ed.), Wiley-Interscience, N.Y., III-221-227, 1975.

*Primary Examiner*—Joseph L. Schofer
*Assistant Examiner*—F. M. Teskin
*Attorney, Agent, or Firm*—William R. Hinds

[57] ABSTRACT

To reduce fouling on reactor surfaces, the surfaces are coated with a protective film of polymeric material of surface energy of less than 15 dynes/cm. The preferred coating materials are polymers of one or more monomer chosen from the 2-(N-alkylperfluorosulphonamido)) alkyl (meth)acrylates or the fluorochemical polymer known as Fluorad (Registered Trade Mark of the 3M company) FC-721.

4 Claims, 1 Drawing Sheet

PROCESS FOR REDUCING REACTOR FOULING DURING POLYMERIZATION IN AN AQUEOUS MEDIUM

This invention relates to polymerisation reactors.

Polymerisation reactors, and especially those used for the production of emulsion polymers often suffer from the build-up of polymeric material on their internal surfaces with extended use. This build-up, referred to variously as "fouling" or "reactor coagulum" is undesirable. In severe cases it may modify flow or mixing patterns and may even have a significant effect on reactor volume.

The removal of such reactor fouling is a direct economic loss as it is rare that any material can be recovered, and the reactor is out of production during the cleaning period. Losses are also incurred from the chemical and energy costs of the cleaning process and any manual work necessary may be both unpleasant and hazardous. Cleaning is often carried out using high pressure water jets, or by refluxing with a caustic solution or with solvent.

Prior art attempts to reduce the amount of fouling have been only partially effective. Efforts have been made to combine good mechanical stability with the minimum amount of shear on the product, consistent with sufficient mixing. Reactor surfaces have been made smooth and free from imperfections or gross chemical attack by the use of polished stainless steel, polytetrafluoroethylene (PTFE) or glass coating. These approaches have the drawback of limiting the range of formulations to be employed, and limiting the range of process variables. They may also be costly, and may allow contamination of the product by small quantities of undesirable metal ions. They may also reduce heat transfer seriously.

An alternative is the treatment of the reactor surfaces by a suitable chemical. This is claimed to be effective in the case of fouling due to polymerisation of monomers absorbed onto the reactor surfaces, either above or below the water line. This form of polymerisation may be referred to as "pop-corn polymerisation" because of the physical appearance of the fouling.

This chemical treatment is of particular interest in the fields of isoprene, butadiene, chloroprene and vinyl chloride polymerisation. Phosphates and polyphosphates have been mentioned in BP 1,484,822; polar organic compounds and dyes in BP 1,521,058, East German Patent 126,444, U.S. Pat. No. 4,105,839 and European Patent 126,991; phenol derivatives in Japanese Kokai 78,77,290; metal sulphides in Japanese Kokai 78,21,910; oxidised amines (Japanese Kokai 78,13,689); dithiocarboxylated polyethyleneimine (Japanese Kokai 78,77,291); dimethyldithiocarbamate in a polyvinyl alcohol-methylol resin mixture in Japanese Kokai 85,71,614; amine/phenol or quinone mixtures (Australian Application 77/9324); sodium bromobenzoate or orthotoluate (German Offen. 2,804,076); Aluminium oxalate (Japanese Kokai Tokkyo Koho 78,112,989); inorganic polysulphides (Japanese Kokai Tokkyo Koho 78,114,891); sodium polythioate (Japanese Kokai Tokkyo Koho 78,109,589); and by coating reactor parts in molten sulphur (BP 799,474). Acrylates and methacrylates and vinyl acetate/acrylonitrile copolymers are mentioned in U.S. Pat. No. 4,517,344 and Japanese Kokai 85,71,601. These processes use the reaction product of p-benzoquinone and 1-8 diaminonapthalene and C.I. Reactive Black 4 dye suspended in water-glass as the coating, respectively. All of these materials must contaminate the product to a greater or lesser degree.

The very quantity of references indicates both the technical and economic importance and the previous intractability of the problem. The present invention, which is directed to this problem, resides in a process for the production of polymers in a polymerisation reactor wherein some or all of the reactor surfaces exposed to gaseous or liquid monomers or their condensed vapours and solutions, and/or some or all raw material inlets and product outlets, are coated with a film of polymeric material of surface energy of less than 15 dynes/cm. which is insoluble in, undamaged by, unreactive with, and unwetted by, any combination of the raw materials or reaction products of the process.

The invention is applicable to reactors such as batch reactors and continuous stirred tank reactors employing water based systems and the product is an emulsion, dispersion or latex, or is a bead polymer. In such reactors a liquid surface may be present or the reactor may be fully filled such as the continuous "Loop" process (GB 1,124,610 and GB 1,220,777).

In principle, any coating could be applied which is not wetted or dissolved and does not absorb or adsorp appreciable amounts of water or the monomers in use in the polymerisation, even in the presence of efficient surface wetters used as emulsion polymerisation stabilisers. Concentrated solutions of such wetters may have surface tensions against air in the range of 20–30 dynes/cm. This may be compared to the surface energy of polyethylene of 31 dynes/cm which is likely to be wetted by such solutions and polytetrafluoroethylene (PTFE) with a surface energy of 18 dynes/cm. which is less likely to be wetted.

The origin of surface energy and surface tension, together with the phenomena of wetting, may be explained in the following way.

A molecule in the bulk of a liquid is attracted equally in all directions. At the surface however there is an inwards force as the number of molecules per unit volume in the vapour above the surface is much less than in the liquid below it. The force in dynes acting at right angles to any line of 1 cm. length in the surface is defined as the surface tension $\delta$. To extend the surface by 1 cm. work of $\delta \times 1$ cm. must be applied.

Similar considerations apply at the interface between two immiscible liquids or the boundary between a liquid and a solid, but these tensions are usually lower due to a more even balance of concentrations of molecules.

In air, the wetting of a surface is determined by the three interfacial tensions involved, i.e. between the solid/liquid (SL), solid/air (SA) and liquid/air (LA) interfaces.

Figure 2:
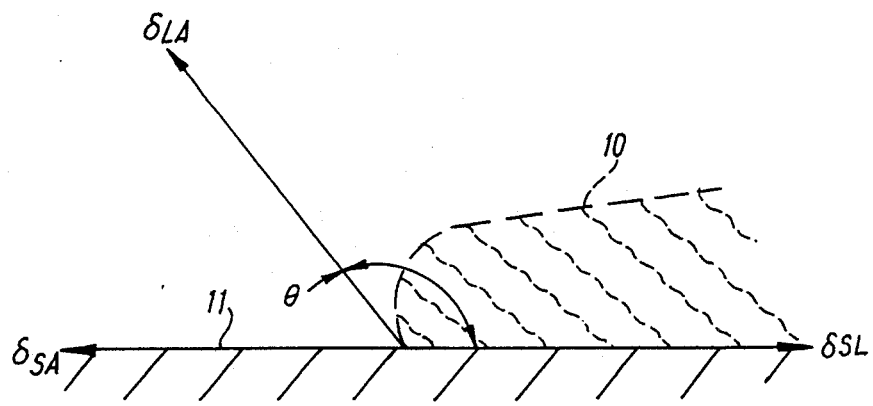

This is enlarged upon with reference to the accompanying drawing in which:

FIG. 1 illustrates the three interfacial tensions where a surface is wetted by a liquid; and FIG. 2 illustrates the three interfacial tensions where a surface is not wetted by a liquid.

In the drawing the contact angle of a drop of liquid (indicated by the dash line 10 and the hatching on a surface 11) is $\theta°$. Conventionally, if $\theta < 90°$ (FIG. 1) the surface is said to be wetted, and if $\theta > 90°$ (FIG. 2) the liquid does not wet the surface. The balance of forces along the direction of the surface at equilibrium:

$$\delta SA = \delta SL + \delta LA^{\cos \theta}$$

where δSA, δSL and δLA are the surface energies or surface tensions of the solid/air, solid/liquid and liquid/air interfaces.

As $\theta$ varies from 0° to 180°, cos $\theta$ varies from 1 to $-1$. At $\theta = 90°$, the conventional boundary between wetting and non-wetting, cos $\theta = 0$.

For spontaneous spreading of the drop therefore: $\theta = 0°$, cos $\theta = 1$ and $\delta SA \geq \delta SL + \delta LA$.

For complete non-wetting and contraction of drops: $\theta = 180°$, cos $\theta = -1$ and $\delta SA \leq \delta SL - \delta LA$.

It is observed that fluorocarbon surfactant solutions with surface tensions as low as 15 dynes/cm. do not wet polytetrafluoroethylene surfaces which have a surface energy quoted at 18 dynes/cm. This indicates that the value for δSL is greater than 18 dynes/cm.

The situation under the surface of an emulsion polymer reactor, where two immiscible liquids are present, is exactly analogous to the above, except that the air is replaced by a second liquid. Whether either the monomer or the water wets the reactor surfaces preferentially or not at all, depends on the construction or coating of the walls, and the influence of any oil and water soluble surface active agents which may be present. Glass has a critical surface energy of greater than 79 dynes/cm., and so will be wetted by most liquids. Steel has the lower level of 40 dynes/cm. and will be readily wetted by most surface active agent solutions. These have surface tensions (against air) of 28–40 dynes/cm. Steel also will be wetted by organic solvents and monomers which usually have surface tensions in the 22–30 dynes/cm. range.

A number of hydrocarbon plastics have surface energies in the range 28–33 dynes/cm. but polytetrafluoroethylene (PTFE) has the value of 18 dynes/cm. It is predictable that it will not be wetted by most liquids, even without detailed solid/liquid interfacial tension information, which is often not readily available.

PTFE has therefore become a favoured material for construction of reactor components, although we have observed that despite its resistance to wetting, it does adsorp or absorb monomer molecules which may subsequently polymerise to give a toughly adhering layer of fouling. Once fouling occurs, the surface energy of the component rises to about 30 dynes/cm. and is readily wetted by monomer, leading to further build-up of fouling.

An example of an effective coating according to this invention is an oleophobic-hydrophobic fluorochemical polymer marketed by the 3M company as "FLUORAD" (Registered Trade Mark) FC-721. Acrylic and methacrylic esters can be made readily from materials expressed generically as 2-(N-alkyl perfluoro alkyl sulphonamide) alkyl acrylate such as N-alkyl perfluorooctane sulphonamide and (meth)acrylic acid and are available from the 3M company as "FLUORAD" (Registered Trade Mark) FX-13, FX-14 and FX-189. These materials are readily polymerisable in solution. "FLUORAD" (Registered Trade Mark) FX-13 comprises of a mixture of isomers of 2-(N-ethylperfluorooctane sulphonamido) ethyl acrylate (CAS number 423-82-5). The octane portion is 80% linear and 20% branched and its average chain length is 7.5 due to a decreasing level of lower alkyl groups down to $C_4F_7-$. Its physical form is a waxy solid of density 1.52 at 90° C., with a melting range of 27°–42° C. and a boiling point of about 150° C. at 1 mm. The surface energy of polymers of this material have been measured at less than 12 dynes/cm, namely at 10.7–11.1 dynes/cm. The perfluorooctane component in the linear or branch chain materials may be replaced by a perfluoro alkyl grouping of chain length in the range of $C_4$ to $C_7$ and $C_9$ to $C_{12}$.

"FLUORAD" (Registered Trade Mark) FX-14 is the corresponding methacrylate ester to FX-13, (CAS number 376-14-7), melting at 32°–52° C. to an amber liquid of density 1.48 at 90° C.

FX-189 is 2-(N-butylperfluorooctane sulphonamido) ethyl acrylate. Films of polymers of FX-14 and FX-189 have been measured to have surface energies of 11.7 dynes/cm and 11.7–12.1 dynes/cm respectively. The ready made polymer FC-721 is readily soluble in fluorinated solvents such as 3M's Fluorinert (Registered Trade Mark) Liquid FC-77 or Du Pont's Freon (Registered Trade Mark) TF. It is not however dissolved or wetted by water, heptane, toluene, acetone or vinyl acetate. Its effectiveness in the application indicates that it cannot absorb or adsorp appreciable amounts of polymerisable monomers.

In practice FC-721 is supplied as a 2% solids solution in Freon (Registered Trade Mark) TF and it can be applied to reactor parts by dipping, spraying or any of the normal methods. The coatings air dry in 15–20 seconds so it may be an advantage to dilute them somewhat in Fluorinert (Registered Trade Mark) FC-77 or Fluorinert (Registered Trade Mark) FC-40 which boil at 97° C. and 155° C. respectively.

An alternative, more dilute, solution of the same polymer is also marketed by the 3M Company as Fluorad (Registered Trade mark) FC-723.

Once applied the coatings can be baked to removed the last traces of solvent, properties of the surface coating being retained up to at least 175° C. in air without loss of repellancy.

To illustrate the invention more fully, the following comparative laboratory trials were run, although it will be understood that these do not imply any limitations in the utility of the invention with regard to method of use or the materials of the reaction.

EXAMPLE 1

This is an example of the preparation of a styrene butyl acrylate copolymer in the ratio of 50.5 parts styrene to 49.5 parts butyl acrylate. The total non-volatiles content was 48% and it was prepared using a redox initiation system at 60°–64° C.

The preparation was conducted in a 2 liter glass flask coated with a thin layer of FC-721.

Results of the material adhering to the equipment and the mobile polymerisation grit were as follows:

|  | Uncoated Reactor (g) | Coated Reactor (g) |
| --- | --- | --- |
| Thermometer | 0.043 | 0.01 |
| Agitator | 0.658 | 0.038 |
| Reactor below liquid level | 0.013 | None |
| Polymerisation grit | 0.370 | 0.127 |

EXAMPLE 2

This is an example of the preparation of a vinyl acetate-Veova (Registered Trade Mark) 10-butyl acrylate emulsion terpolymer in the ratio 70 parts vinyl acetate, 20 parts Veova (Registered Trade Mark) 10 and 10 parts butyl acrylate in the temperature range 60°–64° C.

In this case the continuous Loop process was used, and on a pilot reactor only one pipe, 1" outside diameter, 25 cm. long was coated. Materials adhering to the equipment after 6 hours production of terpolymer at a rate of 200 mls/minute and with an average non-volatiles of 54.5% were as follows:

|  | Uncoated Test Pipe (g) | Coated Test Pipe (g) |
|---|---|---|
| Test Pipe | 2.2 | 0.2 |

In tests conducted in a water-cooled production scale polymerisation Loop reactor coated in accordance with the invention and using a second Loop reactor (uncoated) as a control an improved performance was observed in the coated reactor.

The tests were conducted repeatedly (e.g. 15 times) with each test lasting 24 hours, and the reaction temperature rises noted. In the case of the coated reactor the average temperature rise was 15% less than in the uncoated reactor. This indicates that the heat transfer to cooling water was superior with the coated reactor which in turn indicates that fouling of the reactor was less.

If it is recognised that a Loop reactor can be operated until a maximum temperature (related to the substances being polymerised) is reached then it follows that a coated reactor with its better heat transfer due to reduced fouling will have a longer operating time between cleaning intervals.

What is claimed is:

1. A process for the production of emulsion, dispersion, latex or bead polymers in a water medium in a polymerization reactor wherein the reactor exposed surfaces are coated with a film of oleophobic-hydrophobic polymeric material of surface energy in the range of about 10–15 dynes/cm which is insoluble in, undamaged by, unreactive with and unwetted by the raw materials or reaction products of the process.

2. A process according to claim 1 which uses as the polymeric coating for the reactor a polymer of one or more monomers of the class 2-(N-alkylperfluoro alkyl sulphonamido) alkyl acrylates or methacrylates.

3. A process according to claim 1 which uses as the polymeric coating for the reactor a homopolymer or copolymer consisting of units derived from the monomers 2-(N-ethylperfluorooctane sulphonamido) ethyl acrylate and its methacrylate ester analogue; or 2-(N-butylperfluorooctane sulphonamido) ethyl acrylate and its methacrylate ester analogue, where the perfluorooctane grouping may be either linear or branched.

4. A process according to claim 1 which uses as the polymeric coating for the reactor a homopolymer or copolymer consisting of units derived from the monomers 2-(N-ethylperfluoroalkyl sulphonamido) ethyl acrylate and its methacrylate ester analogue; or 2-(N-butylperfluoroalkyl sulphonamido) ethyl acrylate and its methacrylate ester analogue, where the perfluoroalkyl grouping may be either linear or branched and of chain length in the range $C_4$ to $C_7$ and $C_9$ to $C_{12}$.

* * * * *